United States Patent

Rybar et al.

[11] 4,090,476
[45] May 23, 1978

[54] METHOD AND APPARATUS FOR THE COMBUSTION OF GASEOUS OR LIQUID FUELS

[75] Inventors: Vaclav Rybar; Radovan Drapal; Radim Kabelik, all of Prague, Czechoslovakia

[73] Assignee: Stav, Praha, vyrobni stavebni druzstvo stredisko Monta, Prague, Czechoslovakia

[21] Appl. No.: 743,158

[22] Filed: Nov. 18, 1976

[30] Foreign Application Priority Data

Nov. 18, 1975 Czechoslovakia ............... 7776-75

[51] Int. Cl.² .................. F23D 13/18; F22B 21/00
[52] U.S. Cl. ................. 122/367 PF; 431/328
[58] Field of Search ............ 122/367 R, 367 PF; 431/69, 328

[56] References Cited

U.S. PATENT DOCUMENTS

| | | | |
|---|---|---|---|
| 2,048,446 | 7/1936 | Hays | 122/367 PF |
| 3,320,998 | 5/1967 | Momchilovich | 431/69 |
| 3,421,859 | 1/1969 | Kruggel | 431/328 |
| 3,777,717 | 12/1973 | Mach et al. | 122/367 PF |

*Primary Examiner*—Kenneth W. Sprague

[57] ABSTRACT

A preheated fuel-air mixture is subjected to the following sequential steps: it is ignited, the flame is scanned, the burning mixture is introduced onto the free upper level of a radiation substance charge which is then passed along first heat exchange surfaces, a glowing flameless combustion zone is produced in said charge; beyond said zone the combustion gases are passed along second heat exchange surfaces of an increased area relative to the first heat exchange surfaces, with changed rate of flow. The apparatus is equipped with an ignition and flame scanning gap above said charge and with heat exchange tubes which are divided into several branches past said glowing combustion zone.

6 Claims, 6 Drawing Figures

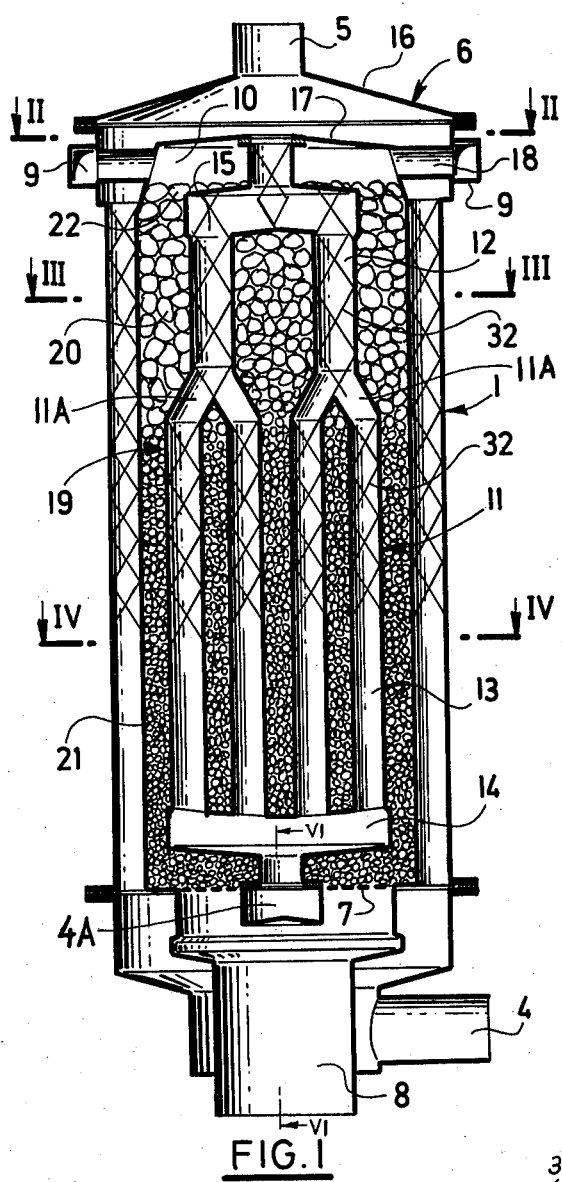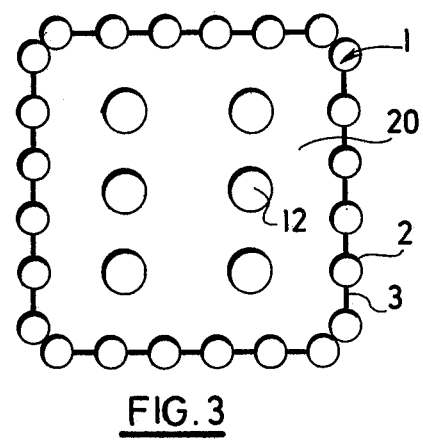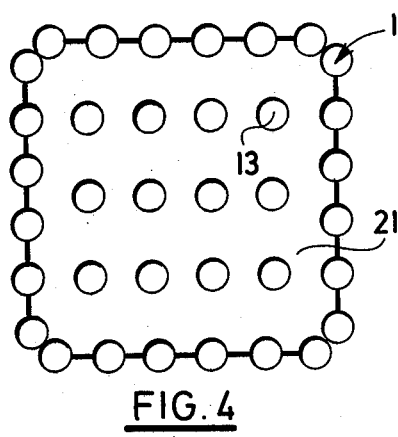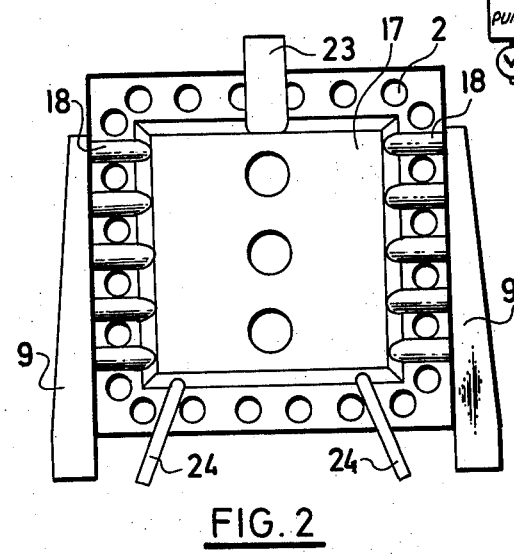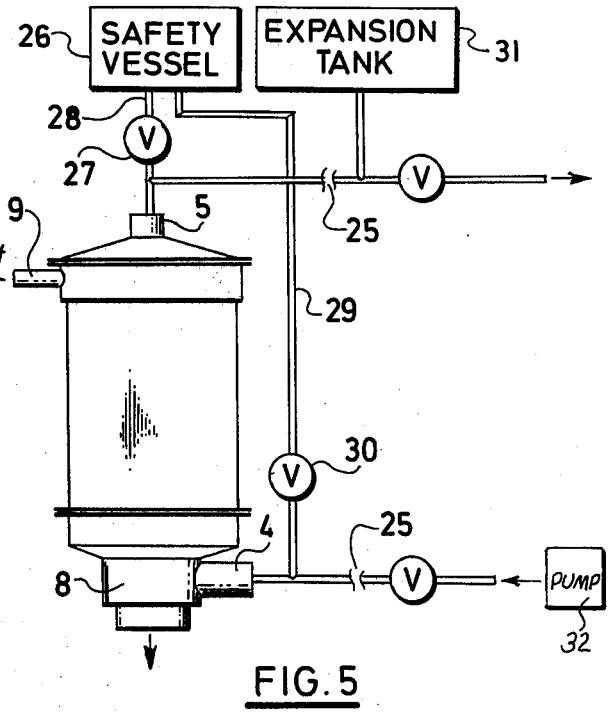
FIG.1
FIG.2
FIG.3
FIG.4
FIG.5

METHOD AND APPARATUS FOR THE COMBUSTION OF GASEOUS OR LIQUID FUELS

BACKGROUND OF THE INVENTION

The invention relates to a method and apparatus for the combustion of a mixture of a gaseous or liquid fuel with an oxidising agent. An apparatus, such as a boiler, containing a charge of a radiation substance is provided for a flameless non-catalytic combustion of said mixture. The invention is primarily intended for use in connection with an apparatus, e.g. a boiler, in which the heat produced by this type of combustion is transferred primarily by radiation to heat exchange surfaces, and from there the heat is transmitted to the medium to be heated, said medium being in direct contact with said heat exchange surfaces.

The method and apparatus according to the invention are primarily intended to be used for the heating of liquids, but if suitably constructed, may also be used for the heating of gases.

DESCRIPTION OF THE PRIOR ART

A number of methods and devices for flameless non-catalytic combustion of gaseous or liquid fuels are known and the present invention is not concerned with flameless combustion as such.

Further known are radiation boilers, operating primarily by means of radiation. Known methods and devices suffer, however, from certain disadvantages and the present invention aims at providing a method and device able to ameliorate these disadvantages.

One of the known boilers contains a combustion chamber, holding a burning mixture of gas and air. Said combustion chamber is closed at one side by a sintered plate provided with a system of parallel channels. After initial heating of one side of said plate, the combustion reaction is transferred into the body of the plate, whose temperature is thereby rapidly increased. Although this type of boiler can achieve a very high temperature, which is a prerequisite of heat transfer by radiation, the boiler cannot be considered a proper radiation boiler, because only a comparatively small proportion of the total generated heat energy is transferred by radiation. In this type of boiler the space behind the plate is empty and the hot combustion products are conducted through this space for further use, without having radiated their heat to the walls confining said space.

There are, furthermore, known numerous types of boilers which operate on the principle of flameless combustion and include a grate disposed underneath a combustion chamber, the top of which is confined by a further grate, e.g. a tubular grate, carrying a charge of ceramic material. The burning gaseous mixture is conducted from said combustion chamber through the upper grate into said ceramic charge, where the combustion of the mixture is terminated. None of the aforedescribed types of boilers can be termed a radiation boiler in the true sense of the word, because only part of the heat is transferred by radiation, while a further considerable proportion is transmitted by convection to the medium to be heated, in the part of the boiler arranged beyond its reaction chamber. Practical experience has shown that so-called radiation boilers equipped with a combustion chamber have a relatively low efficiency.

Another type of boiler is known in which a mixture of fuel and air, neither ignited nor preheated, is introduced into a gas-permeable charge of a radiation substance with a speed exceeding the rate of flame propagation. The radiation substance is, at elevated temperature, brought to a condition in which it transmits substantially the entire thermal energy, released at its surface, by radiation to heat exchange surfaces. This boiler exhibits a very high degree of efficiency, because the actual combustion takes place in a relatively narrow zone of the radiation substance, from which practically the entire thermal energy is emitted by radiation. As a result of this, the combustion products are already cooled beyond this zone to a considerable degree and no further heat exchange surfaces are needed for final cooling, as is the case in the previously described boilers.

FIELD OF THE INVENTION

Radiation boilers are intended to be primarily used for a fully or at least partially automatized operation, such as for heating private houses, blocks of flats, public buildings and the like, where the boiler is not under constant supervision. One of the basic requirements placed on such boilers is a maximum safety against a dangerous breakdown of the boiler, such as an explosion, resulting from a failure of some auxiliary appliance, e.g. interruption of gas or electric current supply, defect of the liquid pump etc. The most dangerous of these breakdown is a short-term failure in the gas supply, during which the mixture in the boiler temporarily ceases to burn whereupon, when the gas supply is restored, the non-ignited gas could accumulate in the boiler and cause an explosion. A similar danger would be present, if the gaseous mixture burnt only in a part of the boiler cross-section, so that in the remaining parts the non-ignited gas could accumulate and endanger the safety of the boiler.

It is therefore imperative to secure the safety of the boiler against such risks and in the first plate against danger due to failures of the gas and/or electricity supply. Such a safety precaution can be accomplished by providing a sensor or feeler in the combustion chamber in which the gaseous mixture is burning prior to its entry into the boiler space, said sensor (feeler) responding to an open flame and cooperating with a valve which closes the gas supply upon extinction of the flame or failure of electric current. Such sensors or feelers are known per se and and their design does not form part of the present invention.

Sensors of the aforementioned type can only be used in boilers in which a combustion chamber is interposed in front of the grate. In those types of boilers, in which a non-ignited and non-preheated mixture is fed into a charge resting on a grate, it is impossible to use such sensors. If such sensors were to be installed in boilers of this type, the gaseous mixture would have to be ignited before its entry into the charge. However, this would cause a drop in efficiency of the boiler to the level of the previously known boilers equipped with a combustion chamber and having a far lower efficiency. Without these provisions, however, the boiler does not afford the required safety against explosion. It is therefore evident that two contradictory requirements have to be met.

The main object of the present invention is to provide such a combination of measures as would meet as far as possible both of the aforedescribed requirements, i.e. that the boiler embodying the invention should, on the one hand, show a very high degree of efficiency and, on the other hand, be safe against an explosion or another dangerous breakdown.

The invention is based on the known method and apparatus of using a flameless, non-catalytic combustion of a gaseous mixture on the surface of grains of a ceramic radiation substance. In the boiler to which the invention refers, the heat exchange surfaces are arranged, on the one hand, on the periphery of the radiation substance charge and, on the other hand, they extend through the interior of said charge, and are in contact with the medium to be heated, which can be either a liquid or a gas.

As mentioned before, the invention is concerned with the combustion of gaseous as well as liquid fuels. The latter, however, have to be first vaporized, in order to be suitable for treatment similar to a gas. The expression "gaseous fuel" used throughout the specification includes therefore also liquid fuels, that have been vaporized.

SUMMARY OF THE INVENTION

According to the essential feature of the invention the preheated mixture of the fuel with the oxidising agent is ignited outside the radiation substance. As soon as a flame, required for scanning, is formed, but still before the mixture reaches its full blaze, the ignited mixture is introduced on the free upper level of the radiation substance and is uniformly distributed over the entire level. Thereafter, in the first phase of the passage of said mixture through the radiation substance, the rate of flow of the mixture is increased to produce a flameless combustion and to form a glowing zone in the radiation substance, and past said zone, in the second phase of the passage through the radiation substance, the area of the heat exchange surfaces adjoining the charge of the radiation substance is increased and the rate of gas flow changed.

The invention relates also to an apparatus for performing the aforedescribed method. The apparatus comprises a continuous peripheral jacket consisting at least partially of tubes, whose axes are parallel to the direction of flow of the gaseous mixture. The jacket houses a gas permeable charge of a radiation substance, between whose free upper level and a cover plate, an ignition and flame scanning gap is disposed. The apparatus is equipped with conduits for the supply of the fuel mixture to the ignition gap and with sensors responding to an open flame. The current energizing circuit for said sensors is also connected to a closing valve for the gas mains. The apparatus includes further a plurality of tubular members for conducting the medium to be heated. These tubular members extend through the radiation substance charge in the direction of the gas flow. At least some of the tubular members divide in the lower portion of the charge into at least two branches which are in communication at their lower ends with a common collector.

A system of tubes conduct the supply of the fuel mixture to said ignition and flame scanning gap which is disposed above the free upper level of the radiation substance charge.

The tubes are distributed uniformly over the upper level of the charge.

The tubes of the peripheral jacket and the tubular members extending through the charge have their lower ends connected to the supply conduit for the liquid to be heated which is attached, on the one hand, to a liquid pump and, on the other hand, to a safety vessel for the liquid, mounted above the apparatus (boiler). The pipes leading from the safety vessel are attached to the intake pipe of the cold liquid leading into the boiler and to the outlet pipe leading therefrom. Both the intake as well as the outlet pipes of the safety vessel are provided with electromagnetic valves, which form part of an electric safety circuit. The electric safety circuit means operate in such a way that the valves are closed, when the circuit is energized, whereas they are open, when no current passes through the circuit means.

The purpose of this arrangement is the following: If the supply of liquid into the boiler is interrupted due to a failure of the electric current supply, and the pump comes to a standstill, the safety vessel is automatically connected to the heating system providing thereby a safety liquid circuit for the boiler. Thereby the heat energy accumulated in the radiation substance of the boiler is transmitted to the liquid in said safety liquid circuit, through which the liquid circulates by gravitation. When the electric supply current for the valves and pump is interrupted, the gas supply is closed simultaneously, due to the activation of the sensors, arranged in the ignition and flame scanning gap, which are no longer energized and respond to this condition by closing the main gas valve.

According to a further feature of the invention the charge of the radiation substance consists of several layers, which are different as to their granulometry and/or quality. This feature is highly advantageous, because by altering the distance between the heat exchange surfaces, or the size of said surfaces, and by suitably adjusting the mode of operation of the boiler, the height and/or the position of the zone of highest temperatures can be adjusted so as to lie in the layer consisting of high-quality material, e.g. a corundum-base material, whereas for the zones subjected to a lower thermal stress, a material of lower quality will be sufficient.

Examples of suitable high quality radiation substances suitable for use in the apparatus of the invention are: Corundum $Al_2O_3$, $\alpha$-Alumina, Zirconium Dioxide $ZrO_2$, Zirconium Silicate $Zr_2SiO_4$, Ostranite, etc.

Examples of suitable lower quality radiation substances suitable for use in the apparatus of the invention are: Fire Clay containing $SiO_2$ and/or $Al_2O_3$, Stawbridge Clay, Magnesite $MgCO_3$, Magnesium Oxide MgO, etc.

The tubes holding the heated liquid are exposed to very elevated temperatures, in particular in their hot zone, where they are in direct contact with the glowing radiation substance. The tubes must therefore be cooled thoroughly. Although liquid is continuously conducted therethrough, it is possible that a laminary stream of gas bubbles forms along the tube walls and the condensation of these bubbles can cause shocks in the boiler. In order to prevent this, helical guide and mixing members, e.g. in the shape of propeller blades or the like, are mounted into the tubes. These members ensure a satisfactory flushing of the tube walls and eliminate the formation of laminary bubble streams.

The apparatus (boiler) according to the invention has numerous advantages as compared with known boilers. By providing an arrangement of branched tubular members, the size of the heat exchange surfaces and thereby the cross-section of the gas flow in an axial direction is advantageously varied and by an appropriate choice of granulometry and quality of the radiation substance, it is possible to control the heat transmission in the boiler so as to achieve optimal values. This explains the unusually high efficiency of the boiler. The boiler may, furthermore, be adapted to various zoning and building department regulations. For example, the temperature of the combustion products may have to be limited according to its location either on the roof of a building (for which certain regulations apply) or in a boiler house or in the basement or cellar of a building (where again a higher temperature of combustion products is called for). In contrast to some known boilers, which have to be started in two stages, i.e., first the ceramic material has to be heated to a predetermined temperature and only then the boiler may be started to operate at its full capacity, the boiler of this invention need not be started in two stages, but may be switched on immediately to its full capacity. It reaches its full performance within a very short time.

A further important advantage of the invention resides in the fact that the usual grate is not required, because the burning mixture enters the radiation substance from above and therefore impinges on the free upper level of the charge. It is well known that a grate is a relatively delicate part of a boiler, which is liable to failures, so that the absence of a grate is of great advantage.

In operation it has been found, that the boiler operates almost noiselessly, which is a further advantage from the point of environment protection.

BRIEF DESCRIPTION OF THE DRAWINGS

The accompanying drawings show an exemplary embodiment of the invention, in the form of a boiler for the heating of premises.

FIG. 1 is a diagrammatic longitudinal section of the boiler;

FIG. 2 is a cross-sectional top plan view along the line II — II of FIG. 1;

FIG. 3 is a sectional schematic view along the line III — III of FIG. 1 which serves to illustrate the arrangement of the tubular members and tubes in the upper portion of the boiler;

FIG. 4 is a sectional schematic view along line IV — IV of FIG. 1 which serves to illustrate the arrangement of the tubular members and tubes in the lower portion of the boiler;

FIG. 5 shows schematically the arrangement of the boiler of the invention in a heating system.

DESCRIPTION OF THE PREFERRED EMBODIMENT

Figure 6:
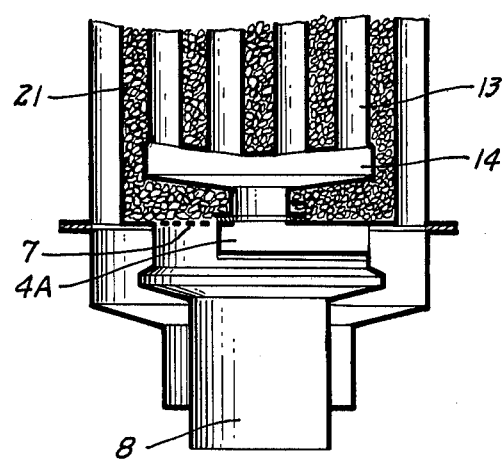
FIG. 6 is a fragmentary view in vertical section taken along the line VI — VI in FIG. 1.

The boiler comprises a continuous peripheral jacket 1. A plurality of parallel tubes 2, whose axes are parallel to the gas flow in the boiler are mounted in the jacket 1. The tubes 2 can adjoin directly one another or include flanges 3 (schematically shown in FIG. 3) which can be interposed between adjacent tubes 2. The flanges 3 can either be separate parts or can be integral with each tube 2. An intake pipe 4 for cold liquid communicates with the boiler at its lower end and an outlet pipe 5 for delivering the heated liquid is mounted at the top of the boiler. The boiler jacket 1 is closed at its top by a double hood 6 and at its lower end by a grid 7. The grid 7 has a neck 8 for the discharge of combustion products which are collected in a non-illustrated receptacle arranged underneath the neck 8. The air-fuel mixture is delivered by a pump 33 through one or more pipelines 9 into an ignition and flame scanning gap 10, situated below the double hood 6.

There are mounted inside the boiler jacket 1 a plurality of tubular members 11. Each tubular member 11 has an upper portion 12 of increased diameter and at least two lower branches 13 of smaller diameter which are in communication with upper portion 12 via connecting tubes 11A. The lower branches 13 lead into a common lower collector 14. The latter is connected to the cold liquid intake pipe 4 through a conduit 4A; pipe 4 supplies liquid also to the jacket 1. The upper portions 12 of the tubular members 11 are connected to an upper common collector 15, leading to the heated liquid outlet pipe 5, which receives also water from the jacket 1.

The double hood 6 includes a cover 16 and a cover plate 17, which limits said ignition and flame scanning gap 10 disposed in the upper portion of the boiler. The fuel mixture is fed to the gap 10 by the pipeline 9 by the action of a pump 33 through a system of conduits 18 which at the same time serve for preheating the fuel air mixture. The tubes 18 are distributed uniformly with regard to the gap 10 (see FIG. 2).

A charge 19 of a radiation substance is disposed in the inner space of the jacket 1 of a radiation substance, preferably in two or more layers 20, 21. These layers respectively consist of materials that differ as to their granulometry and/or quality. For example, the layer 20 is made up of a high quality material, e.g. on the basis of corundum, and this layer is used in the zone of highest temperatures. The layer 21 may consist of a lower quality material.

The ignition and flame scanning gap 10 is therefore bounded at the top by said cover plate 17 and at the bottom by the free upper layer 22 of the layer of high quality radiation substance material 20. The expression "free upper layer" denotes that the fuel mixture impinges directly on this layer of material without having to pass through a grate.

An ignition member 23 is arranged in the gap 10; this member may be an electric spark igniter or a gas pilot burner or the like. There are mounted at the opposite side of the boiler a pair of sensors (feelers) 24 which are adapted to sense an open flame.

A safety vessel 26 (see FIG. 5) is mounted in the liquid supply system 25 of the heating plant, in immediate proximity above the boiler. The vessel 26 is connected via an electromagnetic valve 27 by means of an ascending pipeline 28 to the heated liquid outlet pipe 5 and by means of a descending pipeline 29 via an electromagnetic valve 30 to the cold liquid intake pipe 4.

An expansion tank 31 is interposed in the liquid system 25, as required by safety regulations.

The boiler embodying the invention operates in the following manner:

The fuel air mixture is fed to the boiler by a pump 33. The boiler forms part of a liquid system 25. The ignition member 23 is switched on, the mixture is ignited in the gap 10 and proceeds towards the free upper layer 22 of the radiation substance 20. The flow velocity of the mixture increases during its passage through said radiation substance and a glowing zone of radiation substance is thereby produced. As stated above, this zone is located in the layer 20 which consists of a high-quality radiation material. The greatest proportion of heat is transmitted in this zone by radiation to the heat exchange surface formed by the inner boundary surface of the jacket 1 and by the tubular members 11. During further passage through the charge 19 the temperature of the mixture decreases. The remaining heat is transmitted from the layer 21 of the radiation substance to the increased area of the heat exchange surfaces, i.e., branches 13, while at the same time the heat transmission is assisted by the different granulometry of the radiation substance in the layer 21.

This increased area of heat exchange surfaces is apparent from FIGS. 3 and 4. FIG. 3 is a cross-section through the glowing zone, where the number of upper tubular portions 12 is smaller than in the lower layer 21, where the number of tubular portions 13 is increased, as shown in FIG. 4.

The gap 10 occupies a minimum space which is indispensable for the ignition of the air fuel mixture and the scanning of the flame. This gap 10 cannot be considered a combustion chamber, because the flow velocity of the mixture is too high to permit a proper burning of the mixture in the gap 10.

Helical guiding and mixing members, e.g. in the shape of propeller blades 32, are inserted in the tubes 2, and 11. These members prevent the formation of a laminary stream of vapor bubbles by mixing the liquid flowing through the tubes 2, and 11.

If the gas or electricity supply fails, the sensors 24 respond by closing the valve 34 in the gas mains.

If the supply of electric current is interrupted, so that the liquid pump 32 ceases to operate, the two electromagnetic valves 27, 30 are opened, with the result that the safety vessel 26 is connected to the liquid system 25 of the boiler, constituting thereby a safety liquid circuit comprising the vessel 26, pipeline 29, the boiler, and pipeline 28, and the liquid starts to flow by gravitation through said circuit, absorbing the accumulated heat from the radiation substance 19.

Although the invention is illustrated and described with reference to a preferred method and apparatus, it is to be expressly understood that it is in no way limited to the disclosure of such a preferred method and apparatus, but is capable of numerous modifications within the scope of the appended claims.

What is claimed is:

1. An apparatus for the combustion of gaseous or liquid fuels by substantially flameless non-catalytic combustion of a mixture of the fuel with an oxidising agent, said mixture flowing through said apparatus in a first direction of flow, comprising in combination,
   a. an imperforate jacket having a plurality of parallel first tubes, whose axes are parallel to said first direction of flow of said fuel mixture;
   b. a gas permeable charge of a radiation substance disposed within said jacket and having a free upper layer;
   c. a cover plate mounted in spaced relationship above said free upper layer of said radiation substance; said cover plate and free upper layer defining an ignition and flame scanning gap therebetween;
   d. supply conduit means operatively mounted in said apparatus for conducting said fuel mixture to said gap;
   e. flame scanning means operatively mounted in said apparatus and extending into said gap for sensing an open flame therein;
   f. first valve means operatively mounted in said supply conduit means and adapted to shut-off the supply of fuel mixture to said gap;
   g. first safety electric circuit means connected to said flame scanning means and first valve means and adapted to effect a shut-off of the supply of fuel mixture when said flame scanning means fail to sense a flame in said gap;
   h. a plurality of second heat exchange tubes disposed in said jacket and extending through said charge of a radiation substance in said first direction of flow, at least some of said second tubes are divided into two branch tubes along the lower portion of said charge; and
   i. common collector means connected to the lower ends of said second tubes.

2. The apparatus as set forth in claim 1, wherein said supply conduit means are distributed spatially uniformly relative to said free upper layer of said charge.

3. The apparatus as set forth in claim 1, including a cold intake pipe connected to the lower portion of said apparatus, said first tubes disposed in said jacket and said second tubes extending through said charge being in communication with said cold intake pipe, a pump operatively connected to said cold intake pipe and adapted to pump cold liquid therethrough and into said apparatus, a heated liquid outlet pipe connected to upper portion of said apparatus and being also in communication with said first and second tubes, a safety vessel, first pipe means connecting said safety vessel to said heated liquid outlet pipe and second pipe means connecting said safety vessel to said cold liquid intake pipe, second and third valve means respectively operatively mounted in said first and second pipe means, second safety electric circuit means connected to said second and third valve means so that said second and third valve means remain closed as long as said second circuit means is energized and are open at other times.

4. The apparatus as set forth in claim 1, wherein said gas permeable charge of a radiation substance includes at least two distinct layers which differ in granulometry and quality.

5. The apparatus as set forth in claim 1, including helical guide and mixing members, operatively mounted in at least one of the types of tubes formed by the group of first and second tubes.

6. The apparatus as set forth in claim 4, wherein the upper layer of said two distinct layers is made up of high quality radiation substances selected from the group of Corundum $Al_2O_3$, α-Alumina, Zirconium Dioxide $ZrO_2$, Zirconium Silicate $Zr_2SiO_4$, and ostranite; and the lower layer of said two distinct layers is made up of lower quality radiation substances selected from the group of Fire Clay containing at least $SiO_2$, Stawbridge clay, Magnesite $Mg\ CO_3$ and Magnesium Oxide $MgO$.

* * * * *